(12) United States Patent
Chen et al.

(10) Patent No.: US 11,469,607 B2
(45) Date of Patent: Oct. 11, 2022

(54) VEHICLE BATTERY LEAKAGE DETECTION

(71) Applicant: Ford Global Technologies, LLC, Dearborn, MI (US)

(72) Inventors: Chingchi Chen, Ann Arbor, MI (US); Baojin Wang, Saline, MI (US); Benjamin A. Tabatowski-Bush, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/155,768

(22) Filed: Jan. 22, 2021

(65) Prior Publication Data
US 2022/0239137 A1 Jul. 28, 2022

(51) Int. Cl.
*H02J 7/00* (2006.01)
*B60R 16/033* (2006.01)

(52) U.S. Cl.
CPC ........ *H02J 7/00712* (2020.01); *B60R 16/033* (2013.01); *H02J 7/0047* (2013.01); *H02J 7/0068* (2013.01)

(58) Field of Classification Search
None
See application file for complete search history.

(56) References Cited

U.S. PATENT DOCUMENTS

| 8,103,401 | B2 | 1/2012 | Kubo et al. |
| 9,718,455 | B2 | 8/2017 | Yu et al. |
| 9,945,910 | B2 | 4/2018 | Kiuchi |
| 2017/0264284 | A1* | 9/2017 | Xu .................. H02M 1/08 |

* cited by examiner

*Primary Examiner* — Jared Fureman
*Assistant Examiner* — Aqeel H Bukhari
(74) *Attorney, Agent, or Firm* — David B. Kelley; Brooks Kushman P.C.

(57) ABSTRACT

A circuit is selectively attachable to one of a positive terminal and negative terminal of a traction battery cell via a transistor. The circuit has a current sensor disposed in series with an inductor. A controller operates the transistor such that electrical current from the one of the positive terminal and negative terminal is inverted within the circuit, and while an inductor charge rate is less than a predetermined charge value, inhibits charge and discharge of the traction battery cell.

8 Claims, 3 Drawing Sheets

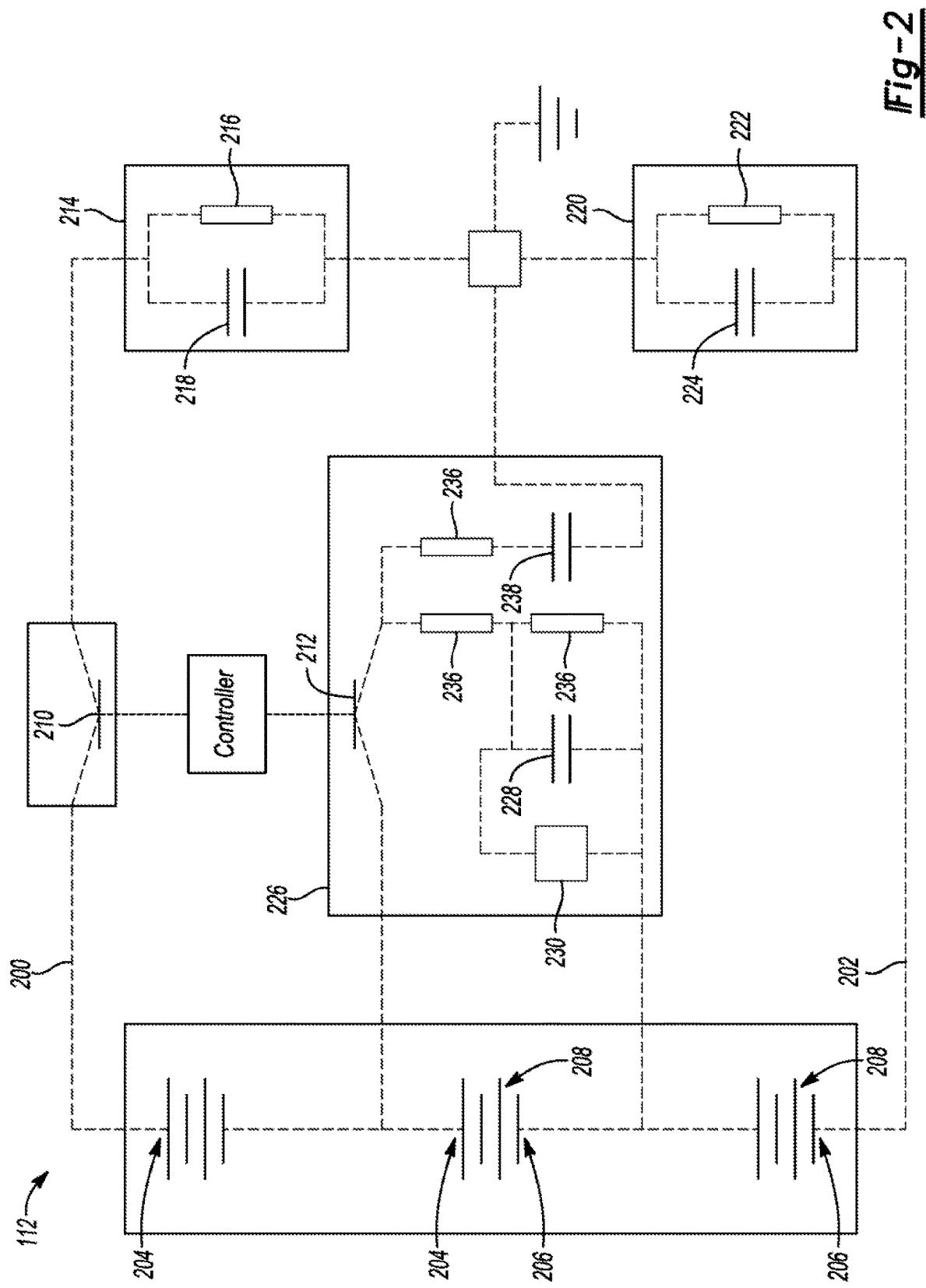

VEHICLE BATTERY LEAKAGE DETECTION

TECHNICAL FIELD

The present disclosure relates to automotive power systems.

BACKGROUND

Certain vehicles may include traction batteries. Leakage currents may be associated with use of such batteries.

SUMMARY

A vehicle may comprise a test circuit and a controller. The test circuit is selectively attachable to one of a positive terminal and negative terminal of a traction battery cell via a transistor. The controller is configured to receive a signal from a voltage sensor disposed across a test capacitor indicative of the voltage of the test capacitor. The controller is further configured to operate the transistor such that electrical current from the one of the positive terminal and negative terminal is inverted within the test circuit. The controller is programmed to in response to one of a capacitor charge rate being less than a predetermined charge value and a capacitor discharge rate being greater than a predetermined discharge value, inhibit operation of the traction battery cell.

BRIEF DESCRIPTION OF THE DRAWINGS

FIG. 2 illustrates a battery test circuit.

DETAILED DESCRIPTION

Figure 1:
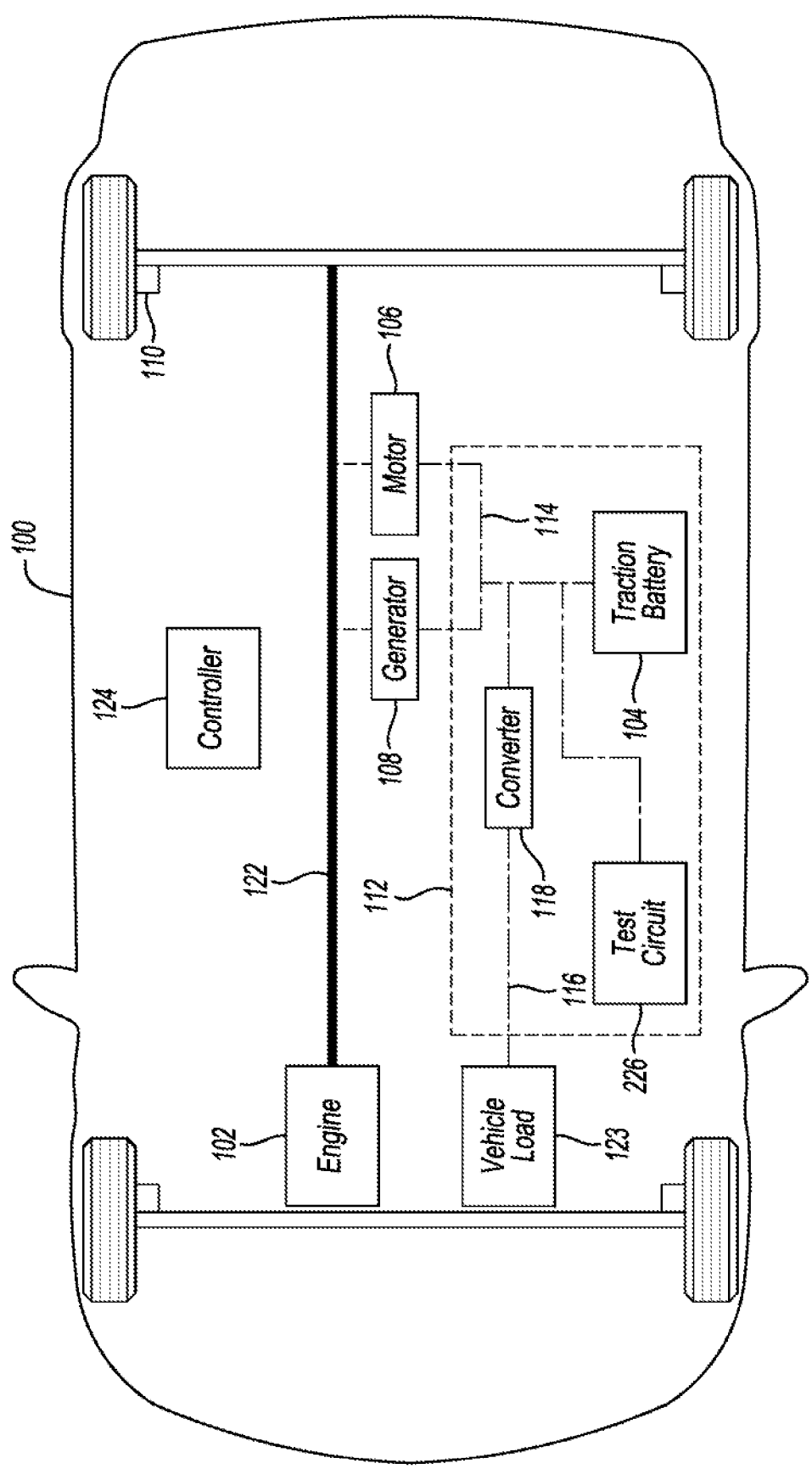
FIG. 1 illustrates a vehicle.

Detailed embodiments are disclosed herein. It, however, is to be understood that the disclosed embodiments are merely exemplary and may be embodied in various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present invention.

Generally speaking, a vehicle may include an engine. The engine may be used to provide torque to a propulsion system within the vehicle. The engine may convert chemical energy from a fuel source into mechanical energy. In particular, the engine may provide mechanical energy in the form of rotational energy exerted upon a crankshaft. The engine may be configured to provide the mechanical energy to a transmission through the crankshaft. The engine may be in communication with a vehicle controller. The engine may include a plurality of sensors. One of the sensors may determine and provide engine parameters to the vehicle controller. For example, an engine sensor may determine and provide engine speed, fuel economy, lubricant level, or other engine parameters.

The vehicle may comprise a vehicle battery. The vehicle battery maybe used to provide torque to a propulsion system within the vehicle. The vehicle battery may be a traction battery. The vehicle battery may be used to store electrical energy. Further, the vehicle battery may be used to convert the stored electrical energy into mechanical energy to propel the vehicle. The vehicle battery may include a plurality of battery cells. In some embodiments, at least two of the battery cells of the plurality of battery cells are in series. In such embodiments, the electrical potential of both of the battery cells may be summed. Alternatively, or additionally, at least two of the battery cells of the plurality of battery cells are in parallel. In such embodiments, the electrical current capacity may be summed. The vehicle battery may have a plurality of sensors. One of the sensors may determine and provide battery parameters to a vehicle controller.

The vehicle battery may have a plurality of terminals. In some embodiments, the vehicle battery may have a pair of terminals. In such embodiments, one of the pair of terminals may be a positive terminal. The positive terminal may be a terminal in direct electrical connection with a positive lead of the vehicle battery. The positive terminal may be in direct electrical communication with a leading vehicle load. The positive terminal may be in electrical communication with a common ground bus terminal via the leading vehicle load. The vehicle battery may have a negative terminal. Similar to the positive terminal, the negative terminal may be in direct electrical communication with a lagging vehicle load. Also, the negative terminal may be in electrical communication with a common ground via the lagging vehicle load.

A vehicle battery having a plurality of battery cells may have a plurality of positive terminals and a plurality of negative terminals. Each of the cells of the plurality of battery cells may comprise a pair of terminals. Further, the vehicle battery may have a plurality of positive terminals, wherein one of the positive terminals of the plurality of terminals is in electrical communication with another of the positive terminals of the plurality of terminals via a positive terminal bus. Similarly, the vehicle battery may have a plurality of negative terminals, wherein one of the negative terminals of the plurality of terminals is in electrical communication with another of the negative terminals of the plurality of terminals via a negative terminal bus.

Further, a vehicle battery having a plurality of battery cells may have a plurality of cell relays. A vehicle including a vehicle battery having a plurality of battery cells in parallel may further include a cell relay between each of the battery cells and one of the positive terminal bus and the negative terminal bus. A vehicle including a vehicle battery having a plurality of battery cells in series may further include a cell relay between each of the battery cells of the plurality of battery cells, wherein when one of the cell relays is in a first position, a battery cell is in series with another battery cell, and wherein when the one of the cell relays is in a second position, the battery cell is disconnected from the another battery cell. In some embodiments, the remaining plurality of battery cells will continue to function.

The vehicle may comprise a drivetrain. The drivetrain may be in at least one of electrical, magnetic, and mechanical communication with at least one of an internal combustion engine, an electric power source, and a regenerative braking system. In some embodiments, the drivetrain may be in fluid communication with the internal combustion engine. For example, the vehicle may have a torque converter between the drivetrain and the internal combustion engine. Alternatively, the vehicle may have a clutch between the drivetrain and the internal combustion engine.

The vehicle may comprise a generator. The generator may be configured to convert mechanical energy into electrical energy. In some embodiments, the generator may be configured to convert mechanical energy from an internal combustion engine into electrical energy for charging a vehicle battery. The generator may also be used to convert mechanical energy from an internal combustion engine into electrical energy for powering a vehicle load. The generator may be configured to output DC electricity.

The vehicle may comprise a motor. The motor may be configured to convert electrical energy into mechanical energy. For example, the motor may be configured to receive electrical energy from a vehicle battery to provide mechanical energy to a vehicle drivetrain. Alternatively, the motor may be configured to receive electrical energy from an electrical bus network. As such, the motor may be configured to receive electrical energy from other vehicle components configured to provide electrical energy to the electrical bus network. The motor may be configured to receive DC electricity.

The vehicle may comprise a regenerative braking system. The regenerative braking system may be in mechanical communication with a plurality of vehicle wheels. The regenerative braking system may be used to convert mechanical energy into electrical energy. For example, the regenerative braking system may be used to convert inertia from braking into electrical energy by using in part, a magnet, to reduce the absolute velocity of a vehicle. Changing magnetic flux may produce an electrical current. The regenerative braking system may be configured to provide the electrical current to an electrical component of the vehicle. For example, the regenerative braking system may be in electrical communication with a vehicle battery, such that the regenerative braking system is configured to produce electricity from inertia gathered from the mechanical communication with the vehicle wheels. Electricity gathered from the regenerative braking system may be converted by the converter such that its electrical parameters are suited for either of the high-voltage and low-voltage electrical bus networks. Alternatively, the regenerative braking system may be configured to produce electricity having electrical parameters suited for either of the high-voltage and low-voltage electrical bus networks.

The vehicle may comprise a power network. The power network may be configured to facilitate the electrical communication between power electronics within a vehicle. The power network may use a plurality of electrical bus networks to facilitate the communication. One of the electrical bus networks may be a high-voltage bus network. The high-voltage bus network may be configured to provide DC electricity to electrical components requiring a high voltage. For example, the high-voltage bus network may be configured to have an electrical potential difference of 500 volts. The high-voltage bus network may be configured to be in direct electrical communication with a vehicle battery. Another of the electrical bus networks may be a low-voltage bus network. The low-voltage bus network may be configured to provide DC electricity to electrical components that require a low voltage. For example, the low-voltage bus network may be configured to have an electrical potential difference of 12 volts. The low-voltage bus network may be in direct electrical communication with a supplementary battery. The power network may have a converter. The converter may be configured to convert electricity of a first set of electrical parameters into a second set of electrical parameters. For example, the converter may be configured to convert electricity at 500 volts into electricity at 12 volts. The power network may include a common ground. The ground may be configured to act as a source of low electrical potential to facilitate the flow of electrical current. In some embodiments, the high-voltage bus network shares a common ground with the low-voltage bus network. Alternatively, the power network may have a plurality of electrical grounds.

The power network may comprise a converter. The converter may be configured to alter electricity of a first set of parameters into electricity of a second set of parameters. In one embodiment, the converter may convert high voltage electricity into low voltage electricity. For example, the converter may convert 480 volts into 24 volts. Additionally, or alternatively, the converter may converter electricity having 24 volts into electricity having 480 volts. The converter may be bidirectional regarding direction of conversion. In some embodiments, the converter may be configured to vary its conversion. In such examples, the converter may be configured to change its conversion in response to a command from a controller. For example, the converter may be configured to convert 480 volts into 24 volts in response to a first command from a controller, and further configured to convert 480 volts into 12 volts in response to a second command from the controller.

The power network may include a plurality of vehicle loads. The plurality of vehicle loads may include a leading vehicle load. The leading vehicle load may be in direct communication with a positive terminal of a vehicle battery. Additionally, the leading vehicle load may be in direct communication with a common ground bus terminal. The leading vehicle load may have a leading vehicle resistance value and a leading vehicle capacitance value. The leading vehicle resistance value may be configured to have a predetermined resistive value. The predetermined resistive value may be dependent upon a resistance schedule. The predetermined resistance schedule may be defined by a plurality of vehicle electronics. Examples of electronics of the plurality of vehicle electronics include climate control, driving selection, driver torque request, vehicle audio, and other electronics that require electrical energy. The predetermined resistance schedule may provide an expected vehicle load resistance value based in part on the vehicle electronics currently in operation. Similarly, the leading vehicle capacitance value may be configured to have a predetermined capacitance value. The predetermined capacitance schedule may be defined by a plurality of vehicle electronics. The predetermined capacitance schedule may provide an expected vehicle load capacitance value based in part on the vehicle electronics currently in operation. Both the leading vehicle resistance value and the leading vehicle capacitance value may fall within a predetermined range. The power network may include a lagging vehicle load. The lagging vehicle load may have components similar to the leading vehicle load, including a lagging vehicle resistance value, a lagging vehicle capacitance value, among other things.

The power network may be in selective electrical communication with a traction battery. The power network may comprise a battery relay. The battery relay may be configured to move between an open and closed state. The open state may correspond to partial traction battery disconnection from the power network. The close state may correspond to a connection of the traction battery to the power network. The power network may be in selective electrical communication with a battery test circuit. Alternatively, or additionally, the power network may define a battery test circuit. The battery test circuit may be attached and removed from the power network via a test relay. Some embodiments may include a plurality of test relays. The battery test circuit may be configured to determine if a vehicle battery parameter is lower than expected. An out of range vehicle battery parameter may be indicative of a shorted or open circuit. For example, the battery test circuit may be configured to determine that a circuit is compromised due to a lower than expected voltage. The battery test circuit may be parallel to a vehicle load of a plurality of vehicle loads. For example, the battery test circuit may be parallel to a leading vehicle load.

The power network may include a voltage sensor. The voltage sensor may be configured to determine an electrical potential difference of a positive terminal and a negative terminal of a battery. As such, the voltage sensor may have a first lead connected to a positive terminal and a second lead connected to a negative terminal. The voltage sensor may be parallel to a vehicle load. The voltage sensor may be further configured to send a signal to a controller indicative of the electrical potential difference between the positive terminal and negative terminal of the battery. Similarly, the power network may include a current sensor. The current sensor may be configured to determine an electrical current draw to or from a vehicle battery. The current sensor may be in series with a vehicle load. The current sensor may be further configured to send a signal to a controller indicative of the electrical current draw to or from the vehicle battery. The power network may include a plurality of at least one of a voltage sensor and a current sensor. In an embodiment including a vehicle battery having a plurality of battery cells, the embodiment may further include a plurality of at least one of a voltage sensor and a current sensor corresponding with at least one of a battery cell of the plurality of battery cells. Some embodiments include at least one of a voltage sensor and a current sensor corresponding with each of the battery cells of the plurality of battery cells.

The power network may comprise a battery test circuit. The battery test circuit may be in direct electrical communication with a vehicle battery. Additionally, or alternatively, the battery test circuit may be in direct electrical communication with a battery cell of a plurality of battery cells in embodiments having a vehicle battery include a plurality of battery cells. The battery test circuit may be configured to detect an unexpected conductivity increase value within the electrical system of a vehicle, including the power network. The battery test circuit may detect an unexpected conductivity increase value by determining a charge rate and discharge rate of a test capacitor. Additionally or alternatively, the battery test circuit may detect an unexpected conductivity increase value by determining a charge rate and discharge rate of a test inductor.

The battery test circuit may include a transistor and at least one of a test capacitor and a test inductor. A vehicle battery may be configured to provide electricity having direct current. A test capacitor may reach potential saturation and remain at a steady potential showing a single charge rate sample. Further, an unexpected conductivity increase value may be difficult to determine from an initial charge rate. Similarly, a test inductor may reach current saturation and remain at steady state electrical current showing a single charge rate sample. As such, the transistor may act as an inverter.

The transistor may be configured to receive a plurality of commands from a controller, including an open command and a close command. The open command may place the transistor in an open state, removing electrical communication of battery test circuit from the vehicle battery. The close command may place the transistor in a close state, providing electrical communication of the battery test circuit to the vehicle battery. The transistor may be configured to receive a plurality of command patterns. A command pattern may be used to open and close the transistor such that electricity having direct current may be inverted into electricity having alternating current. A first command pattern may be used to provide inverted electricity having a first frequency, while a second command pattern may be used to provide inverted electricity having a second frequency.

The test capacitor may be in direct electrical communication with a lead of a transistor. The test capacitor may be configured to charge and discharge inverted electricity from the vehicle battery. The test capacitor may be in electrical communication with a vehicle load. In one embodiment, the test capacitor may be parallel to the vehicle battery. Further, the test capacitor may be parallel to a vehicle load. The test capacitor may be in direct electrical communication with a test sensor. The test sensor may be a voltage sensor. The test sensor may be configured to send a signal to a controller indicative of an electrical potential difference value across the test capacitor. Further the battery test circuit may include a bias capacitor. The bias capacitor may be used to stabilize the battery test circuit.

The test inductor may be in direct electrical communication with a lead of a transistor. The test inductor may be configured to charge and discharge inverted electricity from the vehicle battery. The test inductor may be in electrical communication with a vehicle load. In one embodiment, the test inductor may be resistively sequential to the vehicle battery. Further, the test inductor may be resistively sequential to a vehicle cell. The test capacitor may be in direct electrical communication with a test sensor. The test sensor may be a current sensor. The test sensor may be configured to send a signal to a controller indicative of an electrical current flowing across the test inductor. Further the battery test circuit may include a bias inductor. The bias inductor may be used to stabilize the battery test circuit.

The test may further include a plurality of test resistors. The test resistors may stabilize the battery test circuit. The electrical resistance of each of the resistors of the plurality of test resistors may be predetermined. The plurality of test resistor may include a first resistor, a second resistor, and a third resistor. The first resistor may be in series with the second resistor. The third resistor may be parallel to the first and second resistors. In an embodiment using a test capacitor, the test capacitor may be parallel to the first resistor, and in series with the second resistor. Further, a bias capacitor may be in series with the third resistor. In an embodiment using a test inductor, the test inductor may be in series with the third resistor. Further, a bias inductor may be parallel to the first resistor, and in series with the second resistor.

The vehicle may comprise a controller. The controller may have a memory system and a processor. The memory system may be configured to store instruction sets such as programs, algorithms, methods, etc. The memory system may be further configured to receive, monitor, and store values presented to the controller. Further, the memory may serve as a database. As such, the memory may create, store, and edit data stored in the database. The database may define a schedule. Alternatively, or additionally, the database may define a plurality of schedules. A schedule may include entries used as reference for operating a device. The processor may be configured to execute instruction sets. The controller may be configured to receive signals indicative of information from external sources including but not limited to sensors, devices, and other controllers. The controller may be configured to receive information by various ways including electrical communication and electrical-magnetic communication. Further, the vehicle may comprise a plurality of controllers.

The controller may be a vehicle controller. As such, the controller may be in communication with an engine, a vehicle battery, a drivetrain, an exhaust system, a generator, and a motor of a vehicle. The controller may further be in commutation with braking systems, including a regenerative braking system and a friction braking system. The controller may be configured to retrieve values from each of the components of a vehicle such as engine speed, battery state of charge (SOC), vehicle torque, exhaust flow, and the conditions of a vehicle power network.

The controller may be configured to receive signals indicative of at least one of a battery cell voltage, a battery voltage, a test capacitor voltage, and a test inductor current. In one embodiment, the controller may be programmed to determine an unexpected leakage conductivity value by use of a Diophantine routine. In such an embodiment, the controller may be programmed to determine a charge rate value of the test capacitor, and a discharge rate value of the test capacitor. If one of a charge rate value is lower than a predetermined charge rate threshold, and a discharge rate value of the test capacitor is lower than a predetermined discharge rate threshold, the controller may inhibit operation of at least one cell of a vehicle battery. Additionally, or alternatively, the controller may inhibit operation of an entirety of a vehicle battery. In another embodiment, the controller may determine a charge rate differential value of the test capacitor. If the charge rate differential value is lower than a predetermined charge rate differential threshold, the controller may inhibit at least one cell of a vehicle battery.

The controller may comprise a charge rate schedule. The charge rate schedule may be defined by entries of battery cell SOC values, vehicle battery SOC values, resistor values, capacitor values, among other entries. Further, the charge rate schedule may be defined by entries of component resistances that may affect the electrical behavior within a vehicle electrical system. For example, the charge rate schedule may consider if a vehicle climate control component is in operation during testing of the vehicle battery cell. The controller may define a plurality of predetermined charge rate values. The controller may refer to the plurality of predetermined charge rate values when applying the predetermined charge rate threshold. Similarly, the controller may comprise a discharge rate schedule. The discharge rate schedule may be defined by entries of battery cell SOC values, vehicle battery SOC values, resistor values, capacitor values, among other entries. The controller may define a plurality of predetermined discharge rate values. The controller may refer to the plurality of predetermined discharge rate values when applying the predetermined discharge rate threshold. Further, the controller may comprise a charge differential schedule. The charge differential schedule may be defined by entries of battery cell SOC values, vehicle battery SOC values, resistor values, capacitor values, among other entries. Further, the charge differential schedule may be defined by entries of component resistances that may affect the electrical behavior within a vehicle electrical system. The controller may define a plurality of predetermined charge rate values. The controller may refer to the plurality of predetermined charge rate values when applying the predetermined charge rate threshold.

FIG. 1 illustrates a vehicle 100. The vehicle 100 includes an engine 102, a traction battery 104, a motor 106, a generator 108, a drivetrain 122, a regenerative braking system 110, which includes the generator 108, a power network 112, and various vehicle loads 123. The engine 102 is in mechanical communication with the drivetrain 122, and acts to provide torque to the drivetrain 122. The vehicle 100 also includes a controller 124. The controller 124 is in configured to selectively operate many of the components of the vehicle. Further, the controller 124 is configured to receive signals from various sensors throughout the vehicle indicative of vehicle metrics, performance, status, among other things. The engine 102 is in mechanical communication with the generator 108. The generator 108 is in electrical communication with the power network 112, such that mechanical energy from the engine 102 is converted by the generator 108 into electrical energy to be provided to the power network 112. The traction battery 104 is in electrical communication with the power network 112 and may be charged by the engine 102 via the power network 112. The regenerative braking system 110 is further in electrical communication with the power network 112. The power network 112 is configured to convert inertia from the vehicle 100 into electrical energy. The regenerative braking system 110 may charge the traction battery 104 via the power network 112 from the converted inertia. The motor 106 is in electrical communication with the power network 112. The motor 106 is configured to fulfill propulsion requests to the vehicle using energy for the traction battery 104 via the power network 112.

The power network 112 includes a high voltage bus network 114, a low voltage bus network 116, and a converter 118. The high voltage bus network 114 is in electrical communication with the traction battery 104. The low voltage bus network 116 is used to fulfill electrical energy requests for the vehicle 100 including the vehicle loads 123. Such requests include audio and climate control requests. The high voltage bus network 114 is in electrical communication with the low voltage bus network 116 via the converter 118. The power network 112 further includes a battery test circuit 226. The battery test circuit 226 is in electrical communication with the traction battery 104 via the power network 112. The battery test circuit 226 is configured to test an electrical system of the vehicle 100 to determine voltage leakage.

FIG. 2 illustrates a power network 112. The power network 112 includes a positive terminal bus 200 and a negative terminal bus 202. The positive terminal bus 200 includes a plurality of positive terminals 204. The negative terminal bus 202 includes a plurality of negative terminals 206. In this embodiment, each of the positive terminals of the plurality of positive terminals 204 is in series with another of the positive terminals. Similarly, each of the negative terminals of the plurality of negative terminals 206 is in series with another of the negative terminals. The power network 112 further includes a battery relay 210. The battery relay 210 may be configured to remove electrical communication of the traction battery 104 from the power network 112. The battery relay 210 may be configured to receive a signal from the controller 124 to disrupt the electrical communication. The power network 112 includes a cell relay 212. The cell relay 212 may be configured to selectively attach and remove one of the battery cells of a plurality of battery cells 208 from the power network 112. The cell relay 212 may be configured to actuate in accordance with a signal received from the controller 124. The cell relay 212 may be actuated in a pattern to convert DC electricity into AC electricity in the battery test circuit 226. The power network 112 has a leading vehicle load 214 and a lagging vehicle load 220. The leading vehicle load 214 has a leading vehicle resistance value 216 and a leading vehicle capacitance value 218. Similarly, the lagging vehicle load 220 has a lagging vehicle resistance value 222 and lagging vehicle capacitance value 224. The controller 124 may have a schedule defined be entries of expected resistance and capacitance values of the leading vehicle load 214 and lagging vehicle load 220 based in part on operations being performed in the vehicle.

The power network 112 includes a battery test circuit 226. The battery test circuit 226 includes a test capacitor 228, test voltage sensor 230, and test current sensor 232. The test voltage sensor 230 is configured to determine the voltage across a capacitor and send a signal to the controller 124 indicative of the determined voltage. The test voltage sensor 230 measures the voltage across the test capacitor 228. Further, the controller 124 uses the test voltage sensor 230 to monitor the charge and discharge value of the test capacitor 228. The battery test circuit 226 further includes a plurality of test resistors 236. The test capacitor 228 is in series with a first resistor of the plurality of test resistors 236. The test capacitor 228 is further parallel to a second and third resistor of the plurality of test resistors 236. The battery test circuit 226 includes a bias capacitor 238 that is in series with the third resistor of the plurality of test resistors 236.

Figures 3, 4:
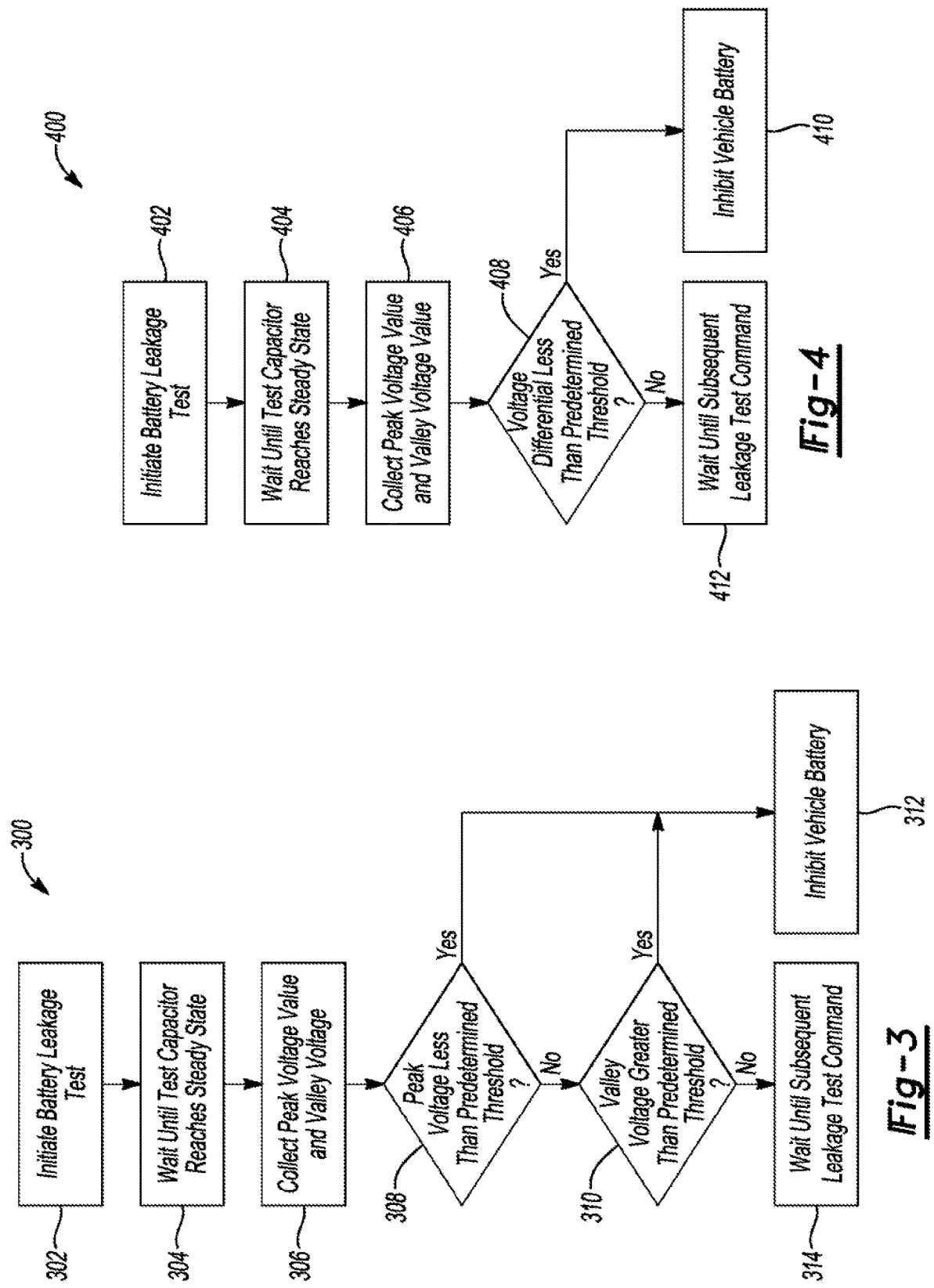
FIG. 3 illustrates a first test algorithm.
FIG. 4 illustrates a second test algorithm.

FIG. 3 illustrates a first test algorithm 300. The first test algorithm 300 begins with an initiate step 302. The initiate step 302 may be triggered by the controller 124. In the initiate step 302, the battery test circuit 226 is activated. Activation will begin actuation of the cell relay 212. The next step is the wait step 304, which allows the voltage, charge, and discharge values of the test capacitor 228 to reach a steady state. In the collect step 306, the first test algorithm 300 will collect the steady state electrical parameter values of the test capacitor 228. Next, in the compare peak step 308, the controller 124 will compare the peak voltage of the test capacitor 228 with a voltage schedule. Further, the first test algorithm 300 will compare the valley voltage of the test capacitor 228 in the compare value step 310. If either the compare peak step 308 or the compare value step 310 determines that the voltage is out of range, the first test algorithm 300 will move to an inhibit battery step 312, in which the controller 124 will inhibit the traction battery 104. The controller 124 may inhibit the traction battery 104 by actuating the battery relay 210. If both the compare peak step 308 and the compare value step 310 determine the voltage is within range, the first test algorithm 300 will move to a return step 314 and wait for a subsequent request to test the battery cell.

FIG. 4 illustrates a second test algorithm 400. The second test algorithm 400 begins with an initiate step 402. The initiate step 402 may be triggered by the controller 124. In the initiate step 402, the battery test circuit 226 is activated. Activation will begin actuation of the cell relay 212. The next step is the wait step 404, which allows the voltage, charge, and discharge values of the test capacitor 228 to reach a steady state. In the collect step 406, the second test algorithm 400 will collect the steady state electrical parameter values of the test capacitor 228. Next in the compare differential step 408, the controller 124 will compare the differential of the charge and the discharge of the voltage of the test capacitor 228 to a set of predetermined charge and discharge values. If the compare differential step 408 determines that the charge and discharge values of the test capacitor 228 are not within range, the second test algorithm 400 will move to an inhibit battery step 410, which will inhibit the traction battery 104. The controller 124 may inhibit the traction battery 104 by actuating the battery relay 210. If the compare differential step 408 determines that the charge and discharge values of the test capacitor 228 are within range, the second test algorithm 400 will move to a return step 412 and wait for a subsequent request to test the battery cell.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle battery system comprising:
    a circuit including a plurality of resistors and selectively attachable to one of a positive terminal and negative terminal of a traction battery cell via a transistor; and
    a controller configured to receive a signal from a voltage sensor disposed across a capacitor indicative of the voltage of the capacitor, to operate the transistor such that electrical current from the one of the positive terminal and negative terminal is inverted within the circuit, and in response to a capacitor discharge rate being greater than a predetermined discharge value, inhibit charge and discharge of the traction battery cell, wherein at least one of the resistors is in parallel to the capacitor.

2. The vehicle battery system of claim 1, wherein the controller is further configured to, in response to a capacitor charge rate being less than a predetermined charge value, inhibit charge and discharge of the traction battery cell.

3. The vehicle battery system of claim 1, wherein the circuit further comprises a bias capacitor.

4. The vehicle battery system of claim 3, wherein at least one of the resistors of the plurality of resistors is in series with the bias capacitor.

5. A battery system comprising:
- a circuit including a bias inductor and a plurality of resistors, and selectively attachable to one of a positive terminal and negative terminal of a traction battery cell via a transistor, the circuit having a current sensor disposed in series with an inductor; and
- a controller configured to operate the transistor such that electrical current from the one of the positive terminal and negative terminal is inverted within the circuit, and while an inductor charge rate is less than a predetermined charge value, inhibit charge and discharge of the traction battery cell.

6. The battery system of claim 5, wherein the controller is further programmed to, while an inductor discharge rate is greater than a predetermined discharge value, inhibit charge and discharge of the traction battery cell.

7. The battery system of claim 5, wherein at least one of the resistors of the plurality of resistors is in series with the test inductor.

8. The battery system of claim 5, wherein at least one of the resistors of the plurality of resistors is parallel to the bias inductor.

* * * * *